United States Patent
Blasco Piquer et al.

(10) Patent No.: US 6,814,994 B2
(45) Date of Patent: Nov. 9, 2004

(54) METHOD AND DEVICE TO OBTAIN FRESH FRUIT FLESH SLICES

(75) Inventors: Miguel Blasco Piquer, Valencia (ES); Sebastian Subirats Huerta, Valencia (ES); Jose Garcia Reverter, Valencia (ES); José Fernández Martínez, Valencia (ES); Antonio Manuel Cotolí García, Valencia (ES)

(73) Assignee: Asociación de Investigación de la Industria Agroalimentario, Valencia (ES)

( * ) Notice: Subject to any disclaimer, the term of this patent is extended or adjusted under 35 U.S.C. 154(b) by 23 days.

(21) Appl. No.: 10/208,766

(22) Filed: Aug. 1, 2002

(65) Prior Publication Data

US 2003/0039732 A1 Feb. 27, 2003

(30) Foreign Application Priority Data

Aug. 3, 2001 (ES) .......................... 200101827

(51) Int. Cl.$^7$ .............................. A23P 1/00; A23N 7/00
(52) U.S. Cl. ......................... 426/482; 426/519; 99/569; 99/540
(58) Field of Search ................................ 426/482, 519; 99/569, 540

(56) References Cited

U.S. PATENT DOCUMENTS

| | | | |
|---|---|---|---|
| 2,570,071 A | 10/1951 | Ralph et al. |
| 3,638,696 A | 2/1972 | Loveland |
| 3,759,168 A | 9/1973 | Johnson et al. |
| 4,353,266 A | 10/1982 | Grothe |
| 4,986,268 A | 1/1991 | Tehrani |
| 5,168,801 A | 12/1992 | Switek, Jr. |
| 5,470,602 A | 11/1995 | Cecil |
| 5,995,462 A | 11/1999 | Harold-Barry |

FOREIGN PATENT DOCUMENTS

| | | | |
|---|---|---|---|
| GB | 392008 A | 5/1933 |
| WO | WO 8607333 A | 10/1986 |

*Primary Examiner*—Anthony Weier
(74) *Attorney, Agent, or Firm*—Pravel Intellectual Property Law, P.C.; James W. Pravel

(57) ABSTRACT

The method includes eliminating the two side caps of the fruit, cutting the remaining portion into slices, optionally classifying by diameter the obtained slices, and finally peeling the slices. The device includes slice cutter (1) provided with two conveyor belts (2) to position the fruit, and blades (4 and 5), —transport equipment for the slices (102) with a diameter gauging device to classify the slices (102) by size, —a slice (102) turning machine and—a slice (102) peeling module to separate the flesh (103) from the pith (104).

18 Claims, 6 Drawing Sheets

METHOD AND DEVICE TO OBTAIN FRESH FRUIT FLESH SLICES

FIELD OF THE INVENTION

This invention relates to a method to obtain slices of peeled fresh fruit flesh for consumer use, from fresh fruits with pith or similar difficulties and properly gauged and washed, together with a device used to obtain slices from whole pieces of fruit.

BACKGROUND OF THE INVENTION

Large kitchens such as those now commonly known as "catering" kitchens, or certain major consumers, such as prepared food establishments selling to the public, banquet rooms, large supermarkets, hospitals, schools etc., have been asking the food processing industry for a system to provide peeled fruit flesh cut in slices, ready for eating, and which can be kept physically stable for a somewhat longer time than foreseen, for its distribution, sale and consumption.

The food processing industry cannot provide a satisfactory device for certain fruits, such as those with very soft flesh or with pith. An example of this is the demand for the most popular fruit, which is orange slices. Consumers ask that these slices:

1.- have flesh that meets the physical integrity conditions (cellular, vesicular, etc.) that enable industrial sanitary processes to provide a life span of at least 10 days from preparation to the end consumer.
2.- that their mechanical aspect maintains a pleasant appearance, in their final presentation and that they are easy to eat using a knife and fork, and
3.- they are free of pith that gives them an undesirable bitter taste.

Peeled orange slices that are currently on the market are either peeled manually and the pith remains are carefully removed manually, or oranges are peeled mechanically and the pith remains are carefully removed mechanically. Both procedures end by mechanically slicing the resulting spherical flesh.

Clean flesh slices obtained manually meet the three previously mentioned conditions, but the costs involved in preparation are incompatible with the industrial processes. The manual process is very unpopular in the food processing industry.

Clean flesh slices obtained mechanically either have unwanted remains of pith, or if they are completely free of pith, the flesh is cut and the cellular and vesicular walls are broken.

Flesh with cuts and broken cells and vesicles does not meet condition 1, as cut and broken flesh means that a large volume of the fruit, and also the abundant dispersed juice, are exposed to a large extent, to bacteria, fungi and enzymes, against which current sanitary treatments are not effective. For example, the most common industrial sanitary treatment is to finally wash the fruit with an aqueous solution of sodium hypochlorite. This solution must be very diluted to prevent the fruit slice from having a taste of bleach. The very small amount of sodium hypochlorite used in the treatment means that its preventive properties are not effective when external agents have too many opportunities to proliferate, such as in this case. These fresh fruit flesh slices have a life span of two days, which is such a short period of time, that purely for logistic reasons, there could be a health risk of consuming the fruit past the sell-by date.

Also, this flesh is a long way from optimum mechanical appearance, it is soft and excessively flexible and does not meet condition 2.

In other fresh fruit slices, such as soft flesh fruit, when slices are prepared following usual industrial methods, there could be similar problems of appearance and sanitary treatment.

SUMMARY OF THE INVENTION

To solve all these problems, a method and device has been designed to obtain fresh fruit flesh slices, which is the purpose of this invention, that provides features directed at automatically preparing peeled fresh fruit slices with pith or with resembling peel, ensuring minimum damage in the vesicular walls where the juice is.

With this invention, the food processing industry is able to offer customers very clean and whole flesh slices of fruits with pith or similar difficulties that meet the three conditions indicated in the previous point. The method consists of a non-intuitive process that makes the slices of the fruit peeled instead of the fruit. In this way, the mechanical support of the peel is used to reduce damage to the flesh during the mechanisation of the process. Sanitary, mechanical and appearance qualities of the fresh peeled and clean flesh are improved to such an extent that they meet the aforementioned conditions satisfactorily.

The flesh remains the same or more integral than when peeling is done manually, because slicing fruit that has already been peeled, such as oranges, puts deforming pressure on an object that has lost the mechanical support of the peel, meaning that cuts and breakage of walls and membrane can occur, together with the dispersion of juice to a greater extent than when the fruit is sliced using this invention. With this method, fresh fruit flesh slices are obtained, in which the suitable aseptic treatment provides a life span of 12 days or more, which is considered acceptable to consumers.

With this invention, the fruit is sliced mechanically by positioning it manually in a two-conveyor belt system. Each of these conveyor belts has holes or optionally cells that are facing each other. The fruit is secured when its axial caps are inserted into these holes or cells. A cap is the end where the peduncle is located, and the other cap corresponds to the opposite apex. The relative position of the caps does not necessarily always have to be the same, simply the axis that joins them always has to be perpendicular to the planes of the belts.

The fruit is therefore positioned on the moving belt with holes. On the outer surface of each belt there is a blade that cuts the corresponding cap. The cap falls and is lead to its final position.

As long as it is the correct thickness, cutting the cap always guarantees that the pith is removed in this portion of the fruit, and therefore the ends remain free of pith and skin, of course.

The rest of the fruit continues to be held, as it is still secured in the holes. It is sliced by a set of blades. If the fruit is positioned between cells, all the blades are between the belts and the caps, and the slices will then be separated in a gauging belt. The next step has two options:

1.- The slices pass to another diameter gauging belt. In the case of oranges, three to five slices per fruit can be cut, as required. Therefore there will be two to three diameters to differentiate (without counting the caps if applicable). The slices, classified according to diameter, are led to peeling module units, The blades of each of these modules are adjusted to peel the slices according to their diameter.
2.- The slices are not differentiated by diameter and are led to a machine with a device that adjusts the blades to cut the slices held by the tongs.

Both options have a common star-shaped feeder that takes the slices from the belt one by one, and places each slice on top of open tongs. The tong arms are in constant circular movement, held to a power-driven revolving machine.

The axle is equipped with accessories that transform the rotary movement of the axle into another type of movement. Therefore, the tong arms continue to move closing and securing the slice of fruit.

The inner surface of the tongs is provided with anti-slip elements, for example two or three cantilevered cams at different levels. Without these elements, it would be difficult to hold a tapered slice, with a smaller diameter at the bottom, as the slice could slide upwards, slipping out of the tongs and causing a machining error. Resistance to vertical movement provided by the anti-slip elements stops slices from sliding upwards.

Without any physical contact, a mechanism moves over the tong, which has a piston alternately moving up and down. The origin of this movement is a rail bushing located on the upper end that moves over the periphery of a slanted disc. The pistons have springs for transmission during the downward vertical movement to the corresponding pushers that almost wrap around the pistons.

When the feeder places a slice of fruit between the open arms of the tongs, the piston is up. While the arms close, the piston lowers and once the tongs hold the slice, the flat end of the pusher presses against it, securing it and preventing it from rotating which it would do during the next step, if it were not secured.

Bordering the circular perimeter of the piston, and therefore the flat base of the pusher, a cutting blade quickly moves depending on the foreseen circumference for peeling. This movement is possible because the pistons have a cogwheel in the centre, that is kept geared by the fixed toothed plate, turning the pistons and consequently, the blades fixed on them, throughout the circular run of the pistons in the cutting module.

The aforementioned circulating blade lowers with the piston, reaching the slice when it is held by the tongs and the pusher. The blade peels the slice of fruit, cutting the flesh along the edge in contact with the pith. An essential parameter during this phase, is the synchronisation between the blade rotation and the movement of the fruit slice. To assist this synchronisation, a blade with a cutting angle lower than 45°, with a straight or concave edge should be used.

The slice of fruit flesh falls flat on a short distance conveyor belt and is led to its destination. The tongs open and the piston moves upwards. The open tongs drop the ring of peel and, if applicable, the pith in an appropriate place, such as another conveyor belt.

In the event that the ring of peel remains held to an arm of the tongs owing to an anti-slip element, and gravity is not sufficient to release the peel so that it falls, a separator bar is placed in the unloading area of the rings of peel. This bar is prismatic, and it has a right-angle triangle section. The bar is positioned so that one of its narrow sides (leg of the section) is in the upper position, parallel to the plane of the circular movement; the wider side (hypotenuse of the section) faces the vector of the circular movement; the angle opposite the aforementioned leg is in the lower position. This lower angle is positioned one or two millimetres above the upper surface of the tong arms, taking advantage of the fact that the height of these arms (from 5 to 8 mm) is always less than the height of the fruit slices (from 10 to 17 mm). As these project, the force vector produced when the ring of peel is released but has not fallen, collides against this slanted surface and unfolds into two components, the downward vector being the actuator forcing the ring of peel to fall.

The fruit flesh sliced in this way has been damaged as little as possible, and will therefore preserve its appearance and mechanical, nutritional and organoleptic qualities. Suitable hygienisation treatment will be sufficient to prolong its life span for twelve days or more, which is longer than what is currently required.

The two options given above are designed to cover the particular cases of manufacturers. In the first option, the slices are gauged by means of a chain belt that runs forming successive cavities that increase in width. The width of each cavity is adjusted to separate slices of a certain diameter, and the caps if present. In the narrowest cavity, which is the first of the series, the slices with the smallest diameter fall and are separated, or the caps if present. In the last cavity, the slices with a diameter before the largest, fall. The largest diameter slices do not fall into any cavity and reach the belt that feeds the corresponding slice peeler module, where the blades are ready to peel this diameter. The other gauged slices go to the corresponding conveyor belt and module.

The orange slices from the classifier unit are transported on a conveyor belt to a roller carriage, which forces them to fall vertically onto another conveyor belt. Owing to the tapered shape of the slices, they always slant towards the base with the smallest diameter. The slices then reach the slice turning machine formed by a system of belts and rollers that force them to turn on the base with the largest diameter, on a reception belt that feeds the peeler module.

In the peeler module of this option, the diameter of the circumference of the blade path is always fixed once the module is in operation. When convenient, this diameter can be modified by stopping the module and adjusting the corresponding mechanical elements to adapt the distance between the blade and the piston axle. Once this is done, the peeling diameter will once again be fixed.

A typical installation of this option is a system of conveyor belts, a system of slicing blades, a gauging belt, a slice turning machine, one to three peeling modules and the elements to transport the final products. It is possible to have one single module if the manufacturer wishes to peel slices of one size, stop the peeling module, readjust the path of the peeling blades and the horizontal circular support, over which the slices move, and then peel slices of the different size. There are less costs involved in this option, but more space is required (if all peeling modules are installed) or more handling (if one single module is installed).

If the second option is selected, the single peeling module has a mechanism that adjusts the circular path of the peeling blades for each slice of fruit. This mechanism is informed of the diameter of the slices entering by an artificial viewing system that detects characteristics, such as, in the case of oranges, a change in colour from the flesh (orange) to the pith (white). This information is used by the mechanism to adjust the path of the peeling blades, so that they cut the flesh right at the edge in contact the pith. By extending the radius of the circumference of the path of the tongs and piston, the time needed to correctly perform this operation is increased, maintaining the mechanical output of a slice of peeled fruit flesh per second.

Alternatively and for cases in which precision in peeling is not essential, the information of the diameter to which the peeling blades should adjust, could come from the tongs. When the arms of the tongs close, depending on the distance, they could already have the information regarding the adjustment of blades.

A typical installation of this option is a system of conveyor belts, a system of slicing blades, a slice turning machine, a peeling module and elements to transport the final products. Higher costs are involved in this option, but less space is required.

DESCRIPTION OF A PREFERRED EMBODIMENT OF THE INVENTION

Figure 1:
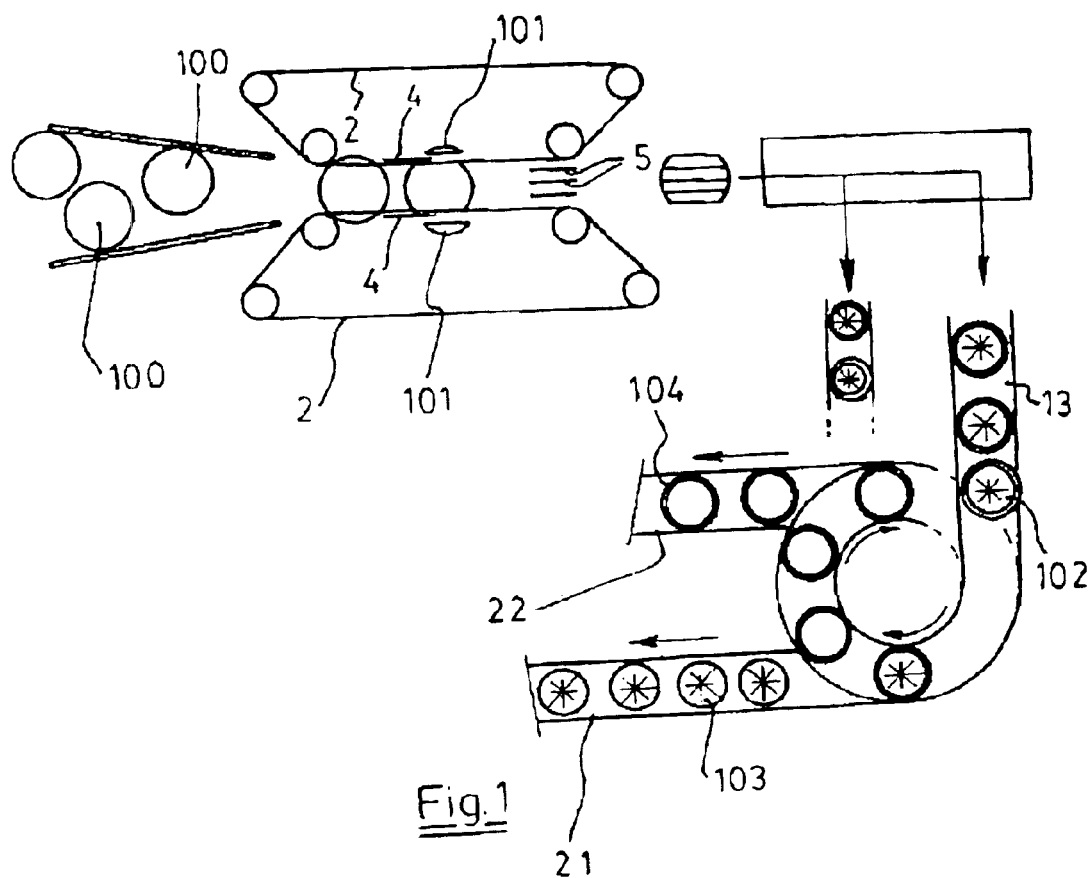
FIG. 1 shows a diagram of the path followed by the fruit until its flesh is sliced without pith or peel.
Figure 2:
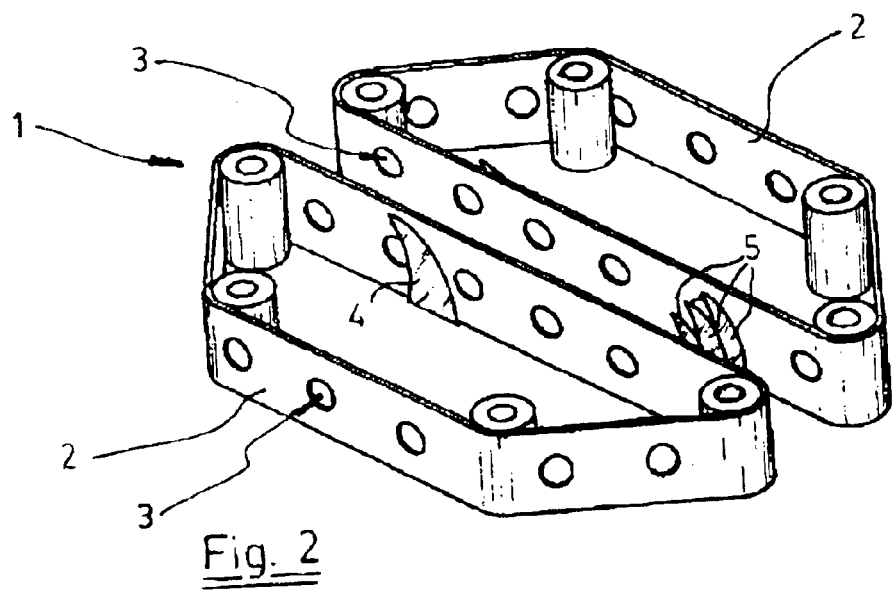
FIG. 2 is a perspective view of the slice cutter.

In the example of manufacture indicated in the figures, the device to obtain fresh fruit flesh slices consists of a slice cutter (1) provided with two facing conveyor belts (2) provided with holes (3) to position the fruit (100), blades (4) to cut the two end caps (101) of the fruit (100) and a set of blades (5) to slice the central portion of the fruit (100) in slices (102).

Figure 3:
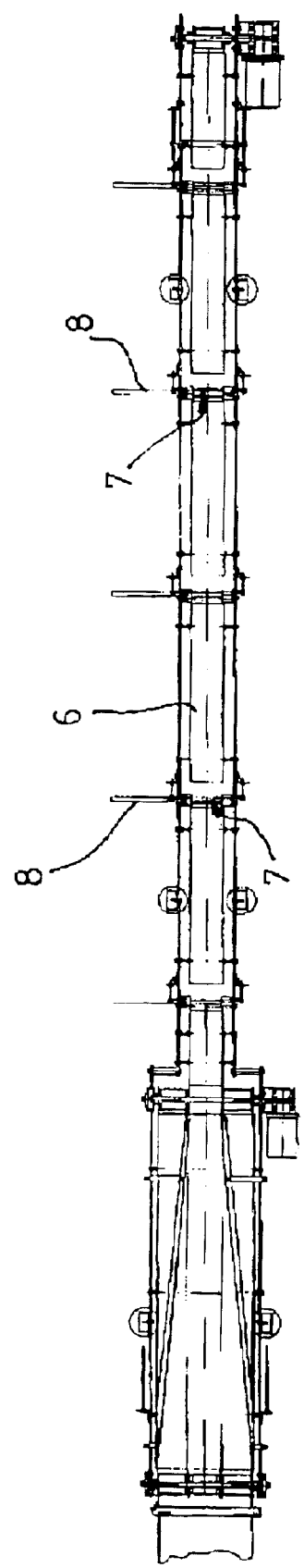
FIG. 3 is a ground view of the slice diameter classifier.
Figure 4:
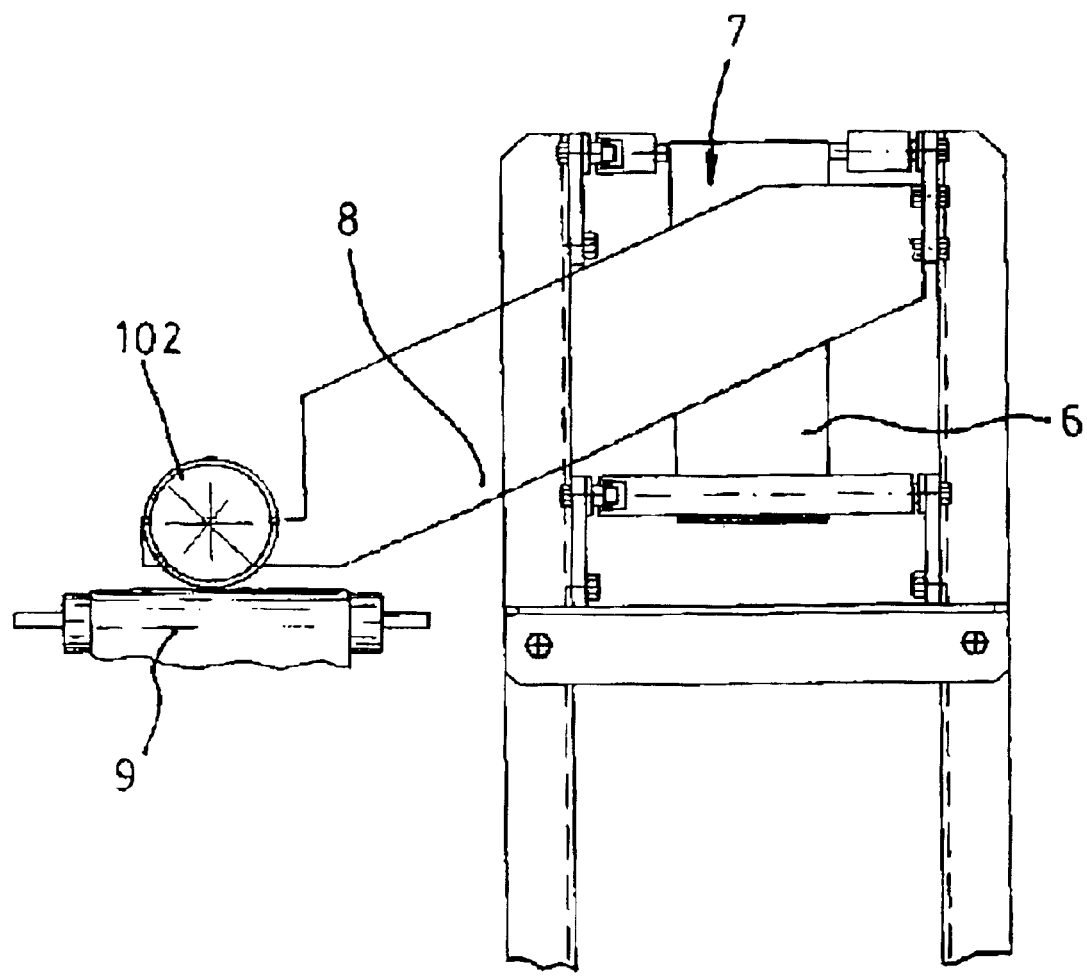
FIG. 4 is an outline view of the vertical section of the classifier, in which the drop channel of the diameter-classified slices can be seen.
Figure 5:
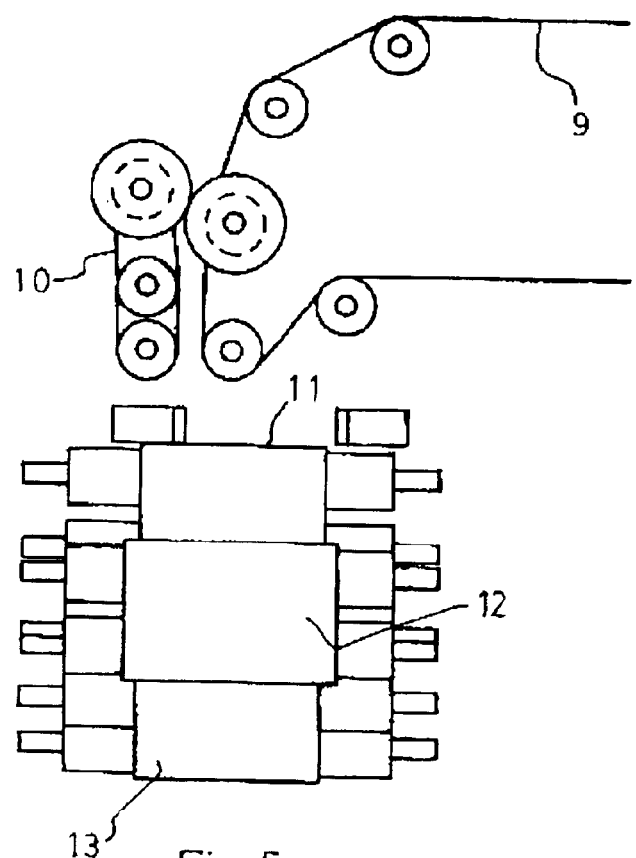
FIGS. 5 and 6 are elevation and outline views of the slice turning machine.
Figure 6:
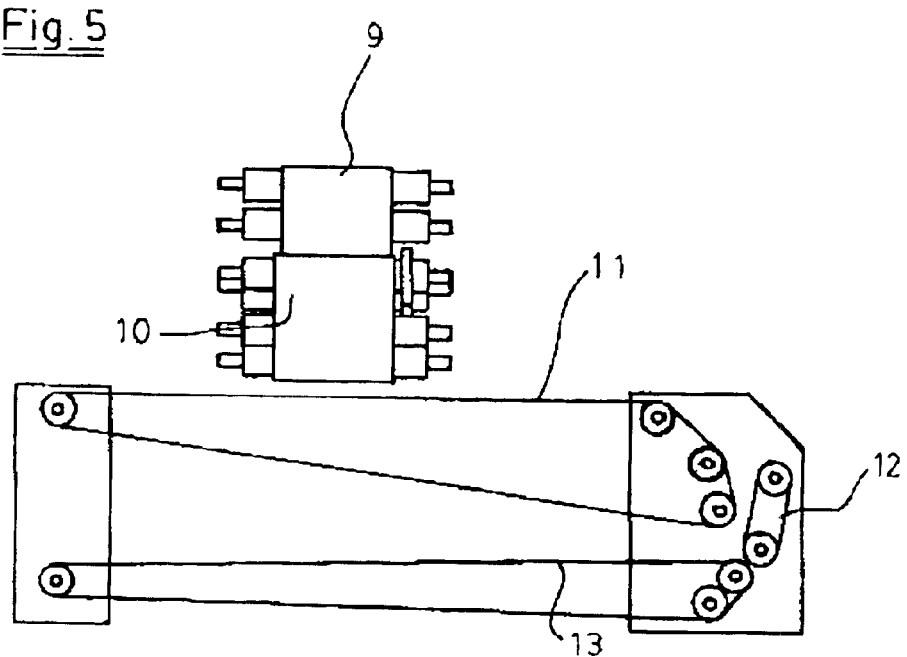

The slices (102) transporter, indicated in FIG. 3, consist of a conveyor belt (6) which has longitudinally separated cavities (7) of increasing width which classify the slices (102) by falling into them, depending on their gauge, through the corresponding channel (8), indicated in FIG. 4, leading to the slice turning machine indicated in FIG. 5 and 6.

Figure 7:
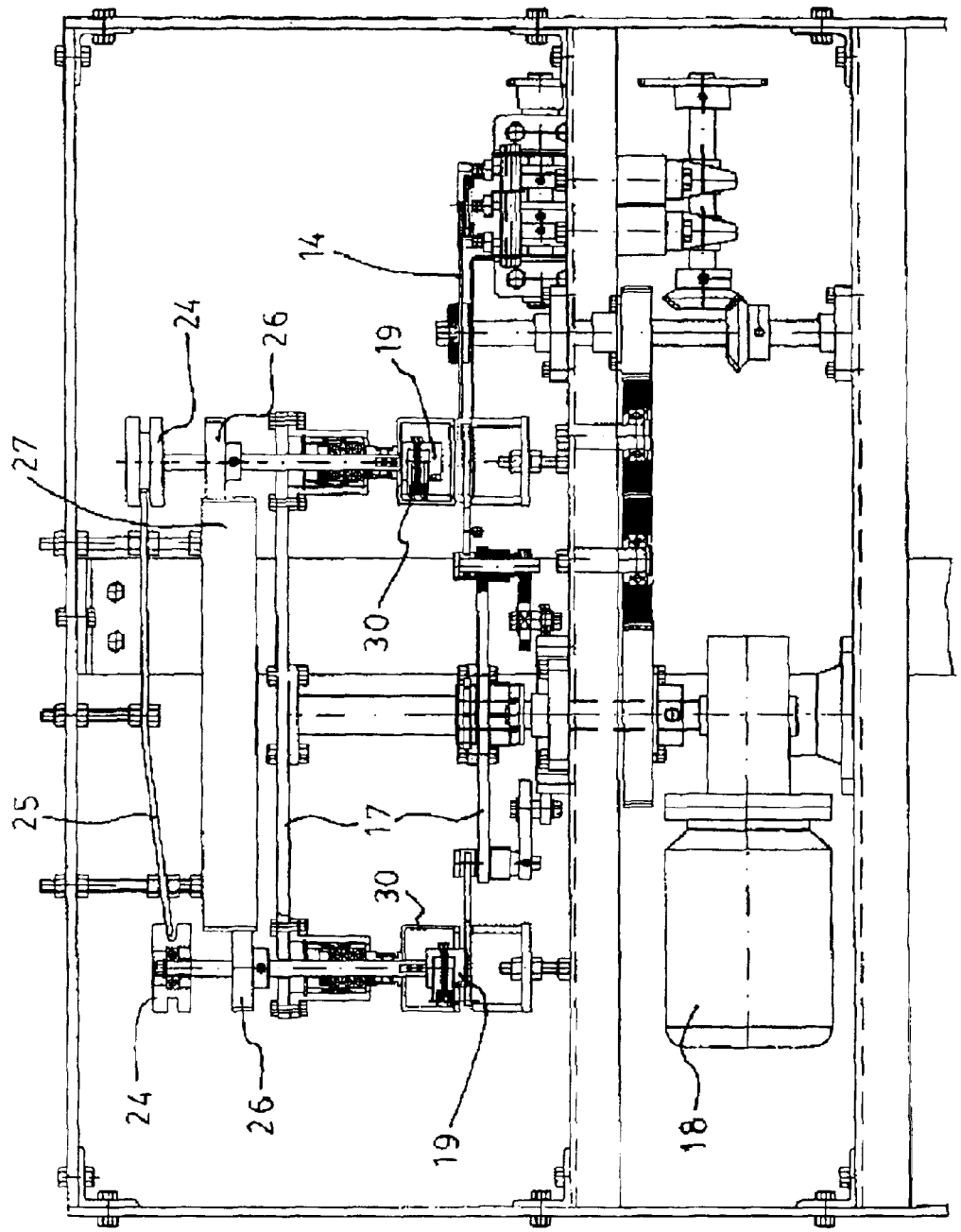
FIG. 7 is an elevation view of the peeling module.

The slice turning machine (102) has a collection belt (9) and a second belt (10) which forces them to fall vertically onto an intermediate belt (11), and stand on their smallest side owing to the tapered nature of the slices (102), making it necessary to turn them. Together with an auxiliary belt (12) that is slightly vertical, the belts (11) place the slices (102) in the reverse position on a belt (13) taking them to the peeling module, indicated in FIG. 7, with them standing on their largest side on this belt (13).

The peeling module consists of a revolving star-shaped feeder (14) that has replaceable parts (15) at the ends, which can be changed to suit the thickness of the slices (102).

The star-shaped feeder (14) introduces the slices (102) successively into a set of tongs (16) assembled in a revolving machine (17), which makes a circular movement driven by a motor (18).

On the revolving machine (17) and above each of the tongs (16), there are pistons (19) with blades (20) used to peel the slices (102) of fruit separating the flesh (103) from the pith (104) which are taken to their corresponding output belts (21) and (22).

The tongs (16) have anti-slip elements (23) in the slice (102) gripping area, to ensure that the slices (102) are secured when they are taken inside the peeling module.

The pistons (19) have a rail bushing (24) on their upper edge, that moves along the outline of a fixed slanted disc (25), giving the pistons (19) and therefore the blades (20) a vertical movement to alternately go upwards and downwards towards the slices (102) secured by the corresponding tongs (16).

The pistons (19) have a cogwheel (26) in the centre that is kept geared with a fixed toothed plate (27) that causes the pistons (19) and the blades (20) to continuously turn; and the turn of the blade (20) in the lower position of the piston (19) causes the slice (102) to be peeled, separating the slice of fruit flesh (103) from the ring of pith (104).

Figure 8:
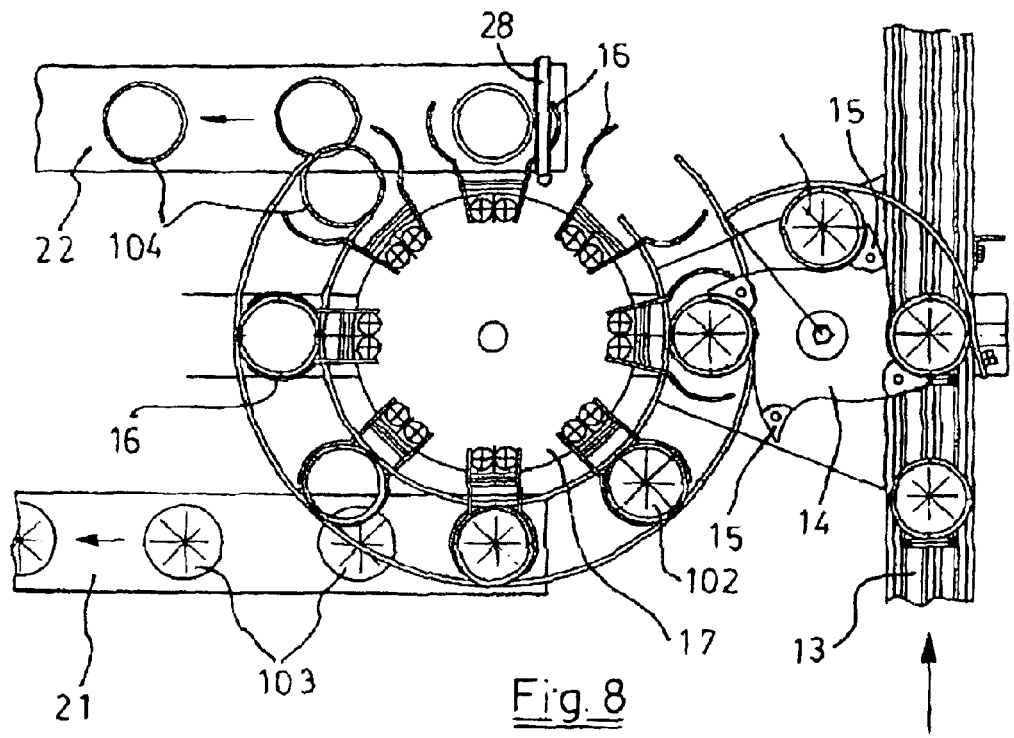
FIG. 8 is a partial ground view of the lower revolving machine of the peeling module, with the corresponding tongs.
Figure 9:
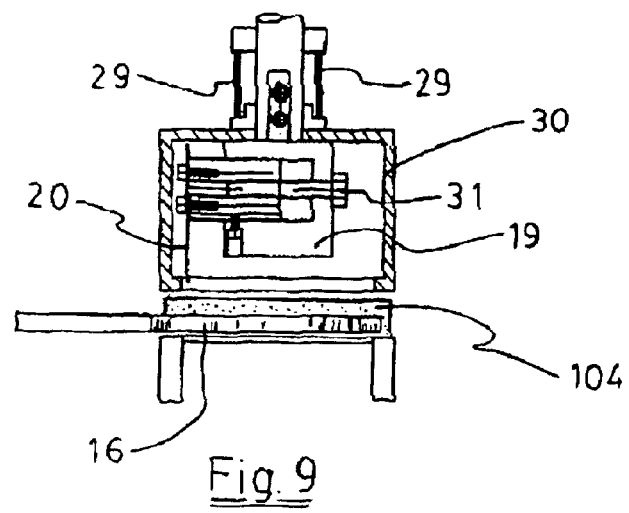
FIG. 9 is a partial section elevation view of the lower part of one of the pistons of the peeling module facing a slice of fruit held by the corresponding tongs.
Figure 10:
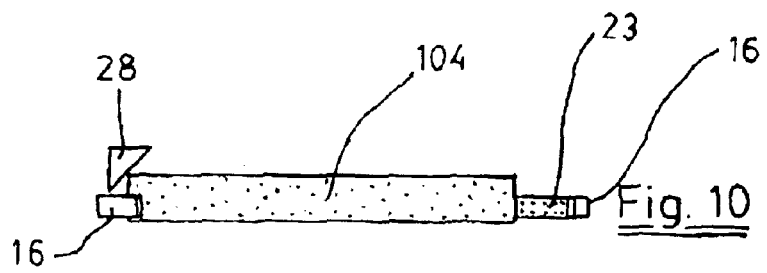
FIG. 10 is a detailed view of how the pith is released from the tongs with the help of the triangular bar.

The peeling module has a triangular-section separator bar (28), at the opening of the tongs (16), indicated in FIGS. 8 and 10, that is used to ensure that the rings of pith (104) retained in the anti-slip elements (23) of the tongs (16), are released.

To stop the slices (102) from turning during peeling, the pistons have springs (29) that act on pushers (30) during the downward path, that press against the pith (104) of the slice (102) to be cut.

The cutting blades (20) are assembled on pistons (19) by means of an adjustment element (31), represented in the manufacturing example by a screw, which enables its position to be adjusted to the outer diameter of the flesh (103) of the slices (102) of fruit to be peeled.

What is claimed is:

1. Method and device to obtain slices of fresh fruit flesh with pith or similar difficulties, comprising the steps of removing two side caps of the fruit, cutting the remaining portion into slices, selectively classifying the obtained slices into diameters, and peeling the slices with a blade, thereby separating the flesh of the slices from a ring of peel of the fruit, causing minimum damage to the vesicular walls that contain the juice wherein said device includes at least two facing conveyor belts (2) for positioning the fruit on said device.

2. Device to obtain slices of fresh fruit flesh, according to claim 1, wherein said device further comprises:
   (a) blades (4) to cut axial caps (101) from the fruit;
   (b) a set of blades (5) to slice the rest of the fruit (100) into slices (102) of a desired thickness;
   (c) a slices (102) transporter having a diameter gauge to classify the slices (102) in sizes;
   (d) a slices (102) turning machine that causes said slices (102) to always stand on their largest surface; and
   (e) a slices (102) peeler module that separates the flesh (103) from the pith (104) and corresponding peel.

3. Device, according to claim 1, wherein said two conveyor belts (2) have facing holes (3) to hold the fruit (100) by their axial caps (101).

4. Device, according to claim 2, wherein said blades (4) can be positioned on the outer surface of the conveyor belts (2) cutting two axial caps (101) of the fruit (100) being conveyed.

5. Device, according to claim 2, wherein said blades (5) used to slice the fruit (100) are positioned parallel between the conveyor belts (2).

6. Device, according to claim 2, wherein said slices (102) transporter comprises conveyor belts (6).

7. Device, according to claim 2, wherein said diameter gauge comprises cavities (7) of increasing width defined by said conveyor belt (6) for the slices (102) to fall towards the slices (102) turning machine, depending on their gauge, through a channel (8).

8. Device, according to claim 2, wherein said slices (102) turning machine includes a slices (102) collection belt (9), a second belt (10) that forces them to fall vertically on a centre belt (11) which, in collaboration with a slightly vertical auxiliary belt (12), places them in the reverse position on a delivery belt (13) that takes them to the peeling module.

9. Device, according to claim 2, wherein said peeling module comprises
   (a) a star-shaped revolving feeder (14) that introduces the slices into the peeling module;
   (b) sets of tongs (16) to hold each slice (102) through their circular path through a revolving machine (17) powered by a motor (18), pushers (30) to immobilise the slices (102) in the peeling position; and
   (c) cutting blades (20) assembled on pistons (19) that following a relative circular movement, cut the flesh (103) while the slice (102) moves in the module, separating the fresh fruit flesh (103) slice from the ring of pith (104), which is then separated from the fastening tongs (16) by a separator bar (28).

10. Device, according to claim 9, wherein said star-shaped feeder (14) has parts (15) at the ends that can be changed to suit the thickness of the slices (102) of fruit (100) to be processed.

11. Device, according to claim 9, wherein said tongs (16) have anti-slip elements (23) in the slice (102) gripping area, to ensure that the slices (102) are secured during their path through the peeling module.

12. Device, according to claim 9, wherein said pistons (19) have a rail bushing (24) on the upper end that moves on the periphery of a fixed slanting disc (25), causing said pistons (19) to alternately move up and down along their circular path.

13. Device, according to claim 9, wherein said pistons (19) have a cogwheel (26) in the center that is kept geared with a fixed toothed plate (27), turning said pistons (19) and consequently said blades (20) are secured on said pistons, during all the circular path of the pistons (19), and the turn of said blades (20) in the lower position of said pistons (19) peels said slices (102) situated on the corresponding tongs (16).

14. Device, according to claim 9, wherein said pistons (19) have springs (29) to transmit, while it lowers, a vertical downward movement on the pushers (30) that hold said slices (102) while they are being peeled by the blades (20).

15. Device, according to claim 9, wherein said cutting blades (20) are assembled on the corresponding pistons (19) with an adjustment element (31) that enables its position to be adapted to the outer diameter of the fruit flesh (103) slices (102) to be cut.

16. Device, according to claim 9, wherein said separator bar (28) is prismatic, with a right-angle triangular section, and is parallel to the plane of the circular movement of said slices (102) in the revolving machine (17), forming a buffer against which the rings of pith (104) retained in the anti-slip elements (23) of the tongs (16), collide causing them to be released and fall.

17. Method and device to obtain slices of fresh fruit flesh having pith material comprising the steps of:
   a. removing at least one cap of said fruit;
   b. cutting the remaining portion of said fruit into slices;
   c. removing a ring of peel from said flesh by cutting said fruit flesh from said ring of peel, whereby minimum damage is caused to the vesicular walls that contain the juice, wherein said device includes at least two facing conveyor belts for positioning the fruit.

18. Device, according to claim 1, wherein said conveyor belts (2) have facing cells to hold the fruit (100) by their axial caps (101).

* * * * *